L. G. FLEMING.
TIRE FASTENER.
APPLICATION FILED OCT. 5, 1912.
1,061,905.
Patented May 13, 1913.
2 SHEETS—SHEET 1.
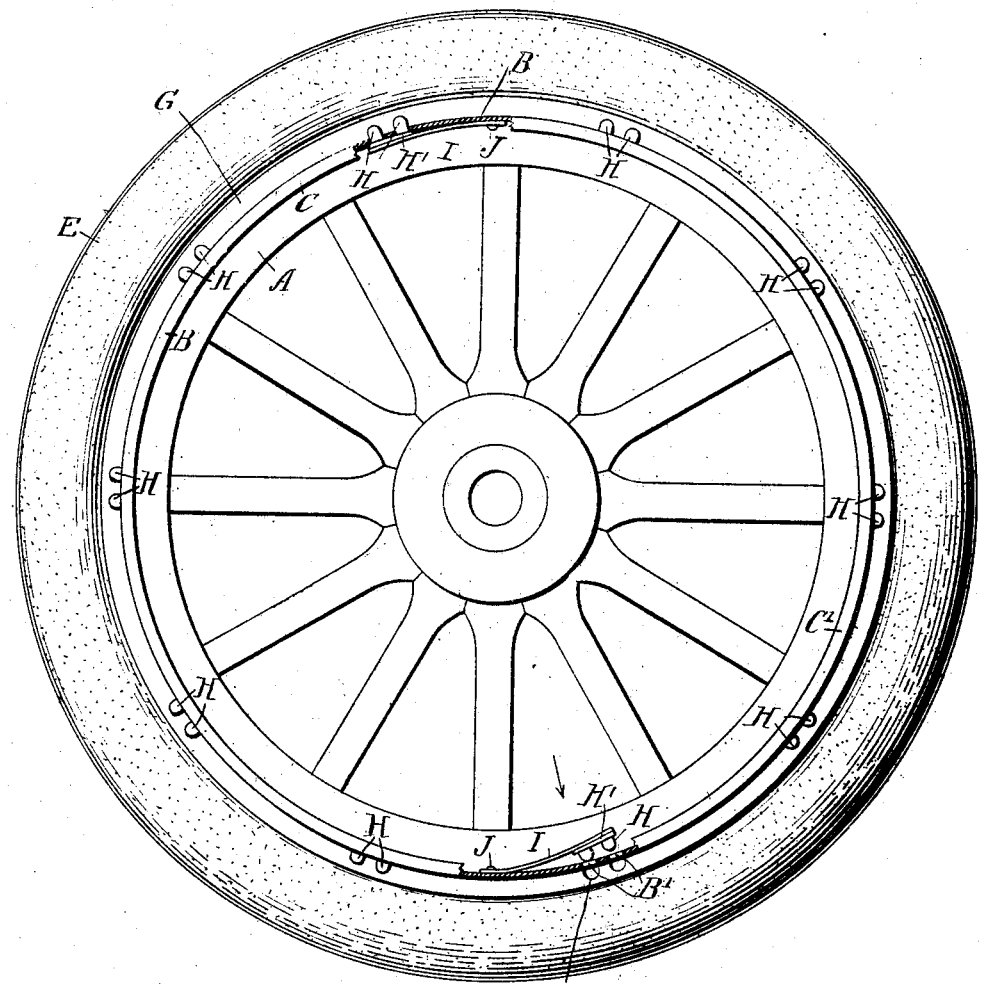
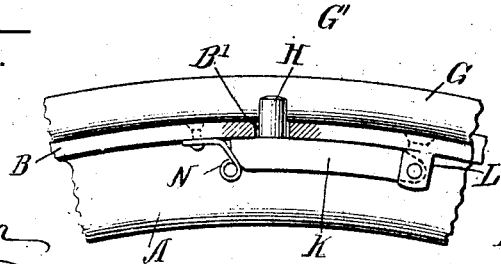

L. G. FLEMING.
TIRE FASTENER.
APPLICATION FILED OCT. 5, 1912.
1,061,905.
Patented May 13, 1913.
2 SHEETS—SHEET 2.
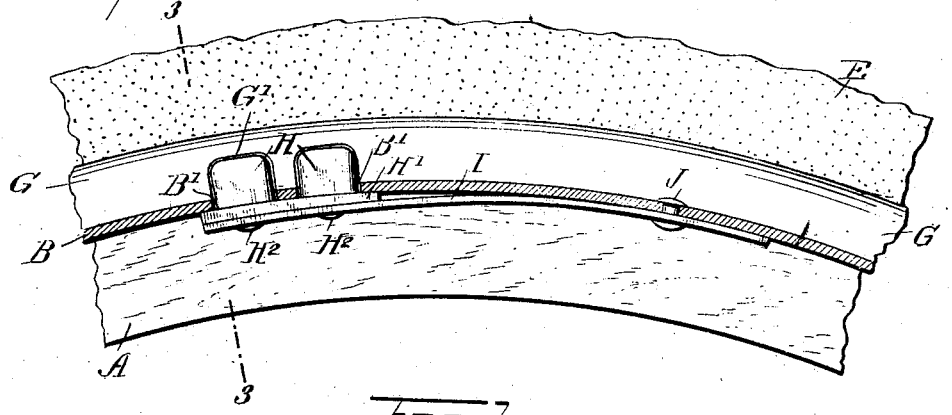
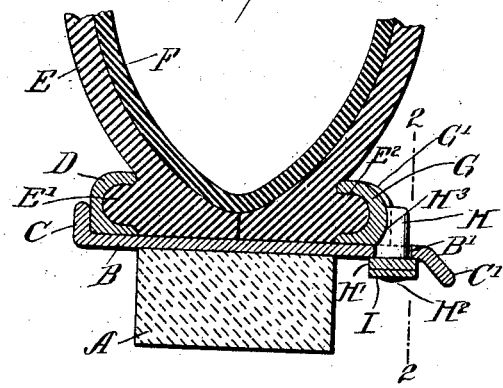
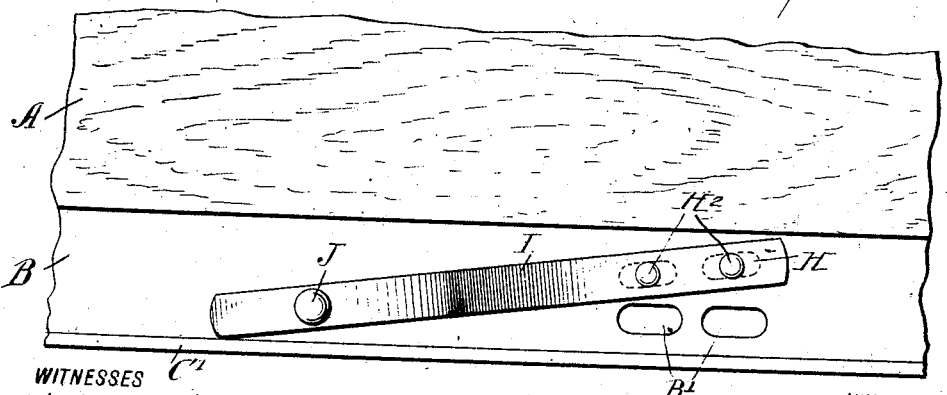
WITNESSES
H. D. Walker
Geo. J. Hosted
INVENTOR
Luke G. Fleming,
BY Munn & Co
ATTORNEYS

UNITED STATES PATENT OFFICE.

LUKE G. FLEMING, OF TARRYTOWN, NEW YORK.

TIRE-FASTENER.

1,061,905.  Specification of Letters Patent.  Patented May 13, 1913.

Application filed October 5, 1912. Serial No. 724,047.

*To all whom it may concern:*

Be it known that I, LUKE G. FLEMING, a citizen of the United States, and a resident of Tarrytown, in the county of Westchester and State of New York, have invented a new and Improved Tire-Fastener, of which the following is a full, clear, and exact description.

The object of the invention is to provide a new and improved tire fastener more especially designed for use on automobile wheels and the like, and arranged to permit of securely fastening the tire in place on the rim of the wheel or quickly removing it therefrom for repairs or other purposes. For the purpose mentioned, use is made of a wheel rim provided at the inner side with a retainer for engagement with the inner side of a tire, a detachable fastening ring removably fitting the outer peripheral face of the said rim at the outer side thereof, the outer side of the rim having spaced apertures outside the said fastening ring, a series of arms or supports held on the inner face of the rim and spaced approximately equal distances apart, and pins on the said supports or arms adapted to engage the said apertures from the inner face of the rim and projecting beyond the peripheral face of the rim to engage the said fastening ring on the outside thereof.

A practical embodiment of the invention is represented in the accompanying drawings forming a part of this specification, in which similar characters of references indicate corresponding parts in all the views.

Figure 1 is a face view of the wheel provided with the improved tire fastener, parts being in section; Fig. 2 is an enlarged sectional side elevation of part of the same on the line 2—2 of Fig. 3; Fig. 3 is a cross section of the same on the line 3—3 of Fig. 2; Fig. 4 is a plan view of part of the wheel and one of the fasteners looking in the direction of the arrow indicated in Fig. 1, the fastener being shown in withdrawn position; and Fig. 5 is a side elevation of a modified form of the tire fastener as applied and part of the rim being shown in section.

On the felly A of an automobile wheel or other wheel is secured a rim B provided at its inner side with an outwardly-extending flange C for the inner clenching ring D to rest against, as plainly shown in Fig. 3, the said clenching ring D engaging the usual rib E' formed on the shoe E containing the inner inflatable tube F. The outer side of the shoe E is provided with the usual rib $E^2$ engaged by a slidable clenching ring G held removably on the outer side of the rim B, which latter is provided at its outer side with an inwardly-inclined flange C' so as to permit of readily placing the clenching ring G in position on the peripheral face of the rim B, it being understood that the said flange C' serves as a guide for the ring G when sliding the latter in place on the rim B.

The clenching ring G is held locked in clenching position against the rib $E^2$ by a series of pins H slidably passing through apertures B' formed in the outer portion of the rim B immediately outside the clenching ring G, as plainly indicated in Fig. 3. The pins H are preferably arranged in pairs, and each pair extends from a base H' fastened by rivets $H^2$ or other fastening means to a support or arm, preferably in the form of a flat spring I connected by a rivet J to the inner face of the rim B. As shown in Fig. 1, the springs I are spaced approximately equal distances apart on the inner face of the rim B, and the springs by their own resiliency hold the pins H normally in locking position against the outer face of the clenching ring G so as to prevent removal of the said ring from the rim B.

When it is desired to remove the shoe E from the rim B for repairs or other purposes, then the operator presses each spring I inwardly until the pins H clear the apertures B', and then the operator swings the spring I in a transverse direction (see Fig. 4) and releases the spring to allow the pins H to abut against the under face of the rim B, thus holding the spring I and the pins H in inactive position to permit the operator to readily remove the clenching ring G from the rim B and likewise the shoe E. After the shoe has been repaired or replaced by a new one, then the said shoe is slipped in position again on the rim B, after which the clenching ring G is replaced and the operator now swings the springs I back until the pins H again register with the apertures B', and then the springs by their own resiliency swing outward to project the pins H through the apertures B' and engage the pins with the outer face of the clenching ring G to lock the latter in place.

The inner side of each pin H is preferably provided with a segmental cut-out portion $H^3$ adapted to engage a correspondinglyshaped recess G' formed in the outer side of the clenching ring G, it being understood that the said recess G' is in register with the corresponding aperture B' and consequently the pin H readily engages the recess G'. By the arrangement described the pins H form abutments for the outer face of the clenching ring G to rest against, and the pins H are held against accidental inward movement toward the center of the wheel owing to the curved recess H³ engaging the correspondingly curved ring G, and creeping movement of the ring is prevented by the retaining pins H engaging the recess G' formed in the said ring G. By providing the pins H with segmental cut-out portions H³ fitting the bottoms of the recesses G', the pins are held normally against displacement on the downward pressure of the shoe E which holds the latter firmly in engagement with the inner clenching cut-out portions H³ of the pins H. When the operator, however, presses the pins H inwardly with considerable force, then the pins H disengage the clenching ring G, as previously explained.

Instead of the springs I for supporting the pins H, use may be made of arms K (see Fig. 5) fulcrumed on the studs L attached to the rim B. The free ends of the arms K are adapted to be locked in place by retaining catches N preferably of spring metal.

Although the shoe E is shown in connection at its inner side with a clenching ring D it is evident that this part of the wheel may be varied without deviating from the invention which rests mainly in the pins H, and springs I or arms K shown and above described.

From the foregoing it will be seen that the inflatable tire can be readily placed in position on the rim B and securely locked in position thereon, and the tire can also be quickly removed from the rim for repairs or other purposes by the operator simply disengaging the pins H from the ring G, then locking the pins in inactive position to permit of easily sliding the ring G off the outer side of the rim B.

Having thus described my invention, I claim as new and desire to secure by Letters Patent:

1. In combination with a wheel rim provided at the inner side with a retainer for engagement with the inner side of a tire, a detachable fastening ring removably fitting the outer peripheral face of the said rim at the outer side, the outer side of the rim having spaced apertures outside the said fastening ring, a series of swing arms arranged on the inner face of the rim and spaced approximately equal distances apart, each swing arm being connected at one end with the rim to allow of swinging the arm in a vertical plane and in a transverse direction, and pins on the free ends of the said swing arms and adapted to register with and engage the said apertures from the inner face of the rim, the said pins when out of register with the said apertures resting against the inner face of the rim and the said pins when in engagement with the said apertures projecting beyond the peripheral face of the rim and engaging the fastening ring on the outside thereof.

2. In combination with a wheel rim provided at the inner side with a retainer for engagement with the inner side of a tire, a detachable fastening ring removably fitting the outer peripheral face of the said rim at the outer side, the outer side of the rim having spaced apertures outside the said fastening ring, a series of flat springs spaced approximately equal distances apart on the inner face of the rim, each spring being pivotally connected at one end to the rim to permit of swinging the spring transversely and to bend the spring in a vertical plane, the springs normally resting against the inner face of the rim, and pins attached to the free ends of the springs and adapted to extend through the said apertures and engaging the said fastening ring on the outside thereof, the said pins being adapted to abut against the inner face of the rim at the time the springs are swung transversely into inactive position and the pins are out of register with the said apertures.

3. In combination with a wheel rim provided at one side with a retainer for engagement with one side of the pneumatic tire, a detachable clenching ring removably fitting on the other side of the said rim, the latter having spaced apertures and the clenching ring having recesses at the outer face in register with the said rim apertures, pins adapted to pass through the rim apertures and having segmental cut-out portions fitting the bottoms of the said recesses, and springs carrying the said pins and attached to the inner face of the rim.

In testimony whereof I have signed my name to this specification in the presence of two subscribing witnesses.

LUKE G. FLEMING.

Witnesses:
Theo. G. Hoster,
Philip D. Rollhaus.